United States Patent
Brenner

(10) Patent No.: US 10,319,206 B2
(45) Date of Patent: Jun. 11, 2019

(54) IDENTIFYING PERSONS OF INTEREST USING MOBILE DEVICE INFORMATION

(71) Applicant: TYCO SAFETY PRODUCTS CANADA LTD., Concord (CA)

(72) Inventor: Mark Brenner, Innisfil (CA)

(73) Assignee: TYCO SAFETY PRODUCTS CANADA LTD., Concord (CA)

( * ) Notice: Subject to any disclaimer, the term of this patent is extended or adjusted under 35 U.S.C. 154(b) by 0 days.

(21) Appl. No.: 15/301,721

(22) PCT Filed: Apr. 27, 2015

(86) PCT No.: PCT/CA2015/050347
§ 371 (c)(1),
(2) Date: Oct. 4, 2016

(87) PCT Pub. No.: WO2015/161387
PCT Pub. Date: Oct. 29, 2015

(65) Prior Publication Data
US 2017/0186297 A1    Jun. 29, 2017

Related U.S. Application Data

(60) Provisional application No. 61/984,087, filed on Apr. 25, 2014.

(51) Int. Cl.
| | |
|---|---|
| *G08B 29/02* | (2006.01) |
| *G08B 15/00* | (2006.01) |
| *H04W 4/029* | (2018.01) |
| *H04W 4/38* | (2018.01) |
| *G08B 25/14* | (2006.01) |
| *H04W 4/02* | (2018.01) |
| *H04W 4/021* | (2018.01) |
| *G08G 1/00* | (2006.01) |

(52) U.S. Cl.
CPC .......... *G08B 15/004* (2013.01); *G08B 25/14* (2013.01); *H04W 4/02* (2013.01); *H04W 4/021* (2013.01); *H04W 4/023* (2013.01); *H04W 4/029* (2018.02); *H04W 4/38* (2018.02); *G08G 1/207* (2013.01)

(58) Field of Classification Search
CPC ....... B60R 25/102; B60R 25/30; B60R 25/31; B60R 25/33; B60R 25/403; G08B 13/19647; G08B 25/10; G08B 15/00; G08B 13/19645; G08B 13/19697; G08B 13/22; G08B 15/002; G08B 15/005; G08B 19/00
USPC ....... 340/506, 545.1, 286.05, 517, 525, 536, 340/531, 542, 5.31, 539.17, 539.14
See application file for complete search history.

(56) References Cited

U.S. PATENT DOCUMENTS

| | | | | |
|---|---|---|---|---|
| 6,529,591 | B1 * | 3/2003 | Dosani | H04M 11/04 379/102.01 |
| 7,391,319 | B1 * | 6/2008 | Walker | G08B 7/06 340/286.05 |

(Continued)

*Primary Examiner* — Daniel Previl
(74) *Attorney, Agent, or Firm* — Arent Fox LLP

(57) ABSTRACT

An alarm system including an alarm panel, a sensor operatively connected to the alarm panel and operable to detect alarm events, and a communicator module operatively connected to the alarm panel and operable to capture signals transmitted by mobile devices within a predefined area, extract mobile device identifiers from the signals, and record the mobile device identifiers in an active device identifier list that is maintained in a memory associated with the communicator module.

21 Claims, 5 Drawing Sheets

(56) References Cited

U.S. PATENT DOCUMENTS

| | | | |
|---|---|---|---|
| 2002/0073333 A1* | 6/2002 | Palka | H04L 41/06 726/11 |
| 2003/0216144 A1 | 11/2003 | Roese et al. | |
| 2009/0161639 A1* | 6/2009 | Ostergren | H04W 48/16 370/338 |
| 2010/0097214 A1* | 4/2010 | Sweeney | G07C 9/00111 340/545.1 |
| 2011/0254680 A1* | 10/2011 | Perkinson | G08B 25/14 340/506 |
| 2012/0092158 A1 | 4/2012 | Kumbhar et al. | |
| 2012/0154138 A1 | 6/2012 | Cohn et al. | |
| 2013/0258110 A1* | 10/2013 | DeMarco | G08B 25/14 348/155 |

* cited by examiner

IDENTIFYING PERSONS OF INTEREST USING MOBILE DEVICE INFORMATION

CROSS-REFERENCE TO RELATED APPLICATION

This application is a National Stage entry of International Application No. PCT/CA2015/050347, filed Apr. 27, 2015, which claims priority to U.S. Provisional Patent Application No. 61/984,087, filed on Apr. 25, 2014, the entirety of which is incorporated herein by reference.

FIELD OF THE DISCLOSURE

The disclosure relates generally to the field of alarm systems, and more particularly to systems and methods for identifying persons in the vicinity of an alarm event at a monitored site using mobile device information.

BACKGROUND OF THE DISCLOSURE

Alarm systems, such as burglar and fire alarm systems, typically include one or more centralized alarm panels that receive information from various sensors distributed throughout a building or area. For example, a typical household burglar alarm system may include a plurality of magnetic contacts, motion sensors, vibration sensors, etc. that are grouped into independently-monitored detection circuits connected to an alarm panel. Each detection circuit may be installed in a designated area or "zone" within a building. During normal operation of the alarm system, the alarm panel may monitor a voltage signal in each detection circuit for variations that may represent the occurrence of a particular alarm event within a zone. For example, an elevated voltage signal in a particular detection circuit may represent the detection of a broken window by a vibration sensor in a corresponding zone of a house, and may cause the alarm panel to enter an alarm mode. The alarm panel may then issue an alarm notification to various first responders (e.g., police, fire, etc.) and/or monitoring entities (e.g., security service providers).

While traditional alarm systems are generally effective for detecting and reporting alarm events, they are limited in their ability to identify individuals who were in the vicinity of a monitored building or area when an alarm event occurred. Such individuals may include criminals whose actions gave rise to the alarm event, and may further include witnesses who may have seen such actions being performed. Some alarm systems include video surveillance cameras, but these can be easily circumvented or disabled by motivated individuals.

In view of the foregoing, it would be advantageous to provide a system and an associated method for effectively identifying persons who were in the vicinity of a monitored building or area when an alarm event occurred. It would further be advantageous to provide such a system that is not susceptible to easy circumvention.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of an alarm system for identifying persons of interest in accordance with the present disclosure may include an alarm panel, a sensor operatively connected to the alarm panel and operable to detect alarm events, and a communicator module operatively connected to the alarm panel and operable to capture signals transmitted by mobile devices within a predefined area, extract mobile device identifiers from the signals, and record the mobile device identifiers in an active device identifier list that is maintained in a memory associated with the communicator module.

An exemplary embodiment of a method for identifying persons of interest in accordance with the present disclosure may include receiving, at a communicator module in an alarm panel of an alarm system, a signal transmitted from a mobile device that is in a vicinity of a monitored site where the alarm system is installed, the communicator module extracting a mobile device identifier from the signal, the communicator module determining whether the mobile device identifier should be added to an active device identifier list, and the communicator module adding the mobile device identifier to the active device identifier list if it is determined that the mobile device identifier should be added to the active device identifier list.

Another exemplary embodiment of a method for identifying persons of interest in accordance with the present disclosure may include a mobile network service provider maintaining a database of mobile device identifiers, timestamps, and geographic locations associated with check-in packets transmitted by mobile devices, and a central station issuing, upon receiving a notification of an alarm event at a monitored site that is monitored by the central station, a request to the mobile network service provider for mobile device identifiers associated with mobile devices determined to have been within the predetermined area during a predefined event period.

DETAILED DESCRIPTION

Figure 1:
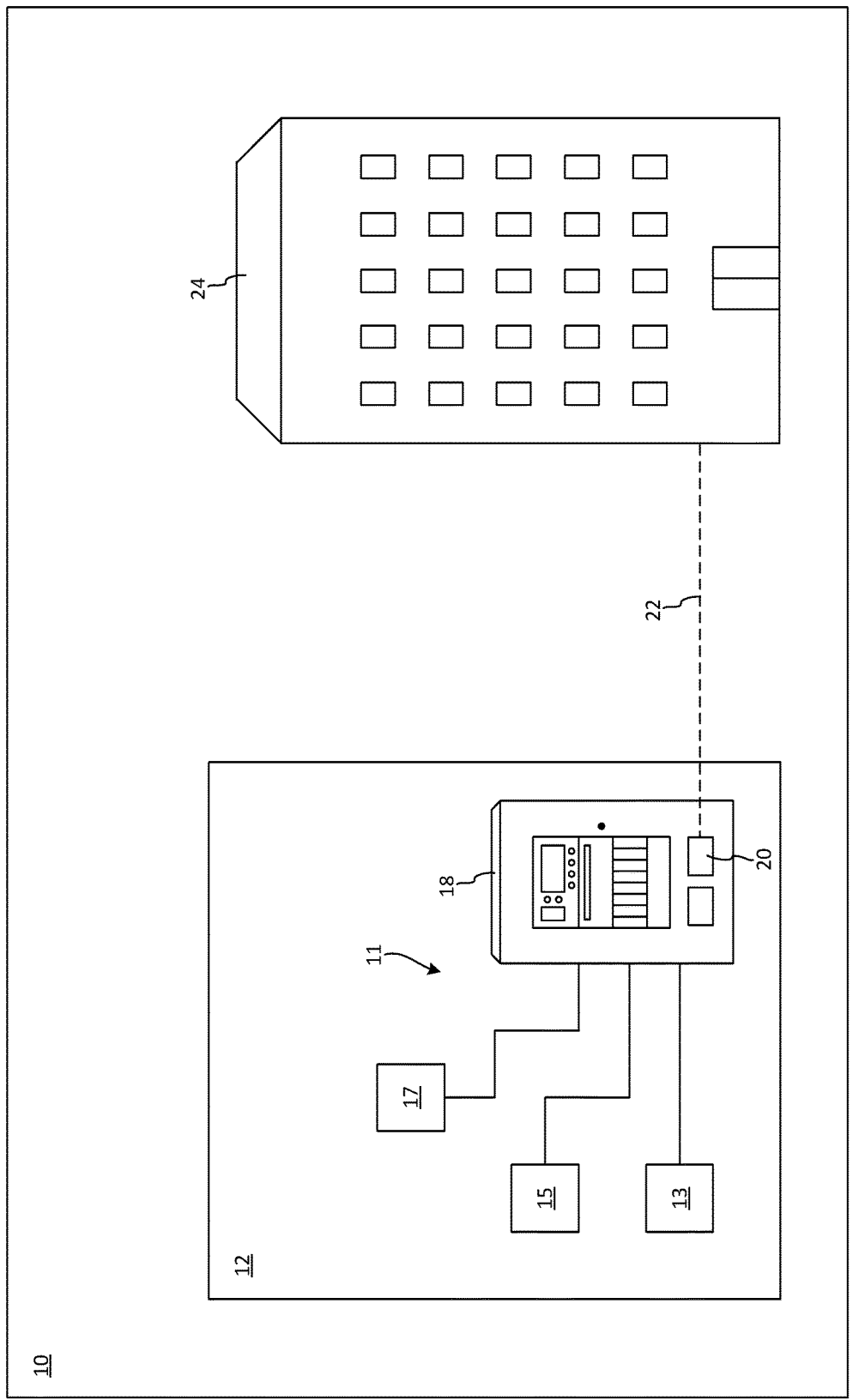
FIG. 1 is a schematic diagram illustrating an exemplary embodiment of a system for identifying persons of interest in accordance with the present disclosure.

In accordance with the present disclosure, systems and methods for capturing identifying information transmitted by mobile devices (e.g., cell phones, tablet computers, laptop computers, smart watches, portable media players, etc.) carried by individuals in the vicinity of an alarm event (e.g., a fire, a break in, etc.) will now be described more fully hereinafter with reference to the accompanying drawings. Such individuals may include persons whose actions may have given rise to the alarm event and individuals who may have witnessed such actions. All such individuals are collectively referred to herein as "persons of interest." The system and method may be embodied in many different forms and should not be construed as being limited to the embodiments set forth herein. Rather, these embodiments are provided so that this disclosure will be thorough and complete, and will fully convey the scope of the system and method to those skilled in the art. In the drawings, like numbers refer to like elements throughout.

Referring to FIG. 1, a schematic diagram of a system 10 in accordance with the present disclosure is shown. The system 10 may include an alarm system 11 that may be, or may include, any type of alarm system, including, but not limited to, various types of fire and/or security systems that may be configured to detect and report various types of alarm events (e.g., fire, intrusion, etc.) that may take place at a monitored site 12. The monitored site 12 may be any type of structure or area in which an alarm system can be installed, including, but not limited to, a residential home, an office, a retail establishment, a hospital, a sporting venue, a theater, a school, etc.

The alarm system 11 may include a plurality of sensors 13, 15, 17 that may be distributed throughout the monitored site 12 and that may be operatively connected to one or more alarm panels 18 located at the monitored site 12. The sensors 13-17 may include, but are not limited to, contact sensors, motion sensors, vibration sensors, temperature sensors, smoke detectors, carbon monoxide detectors, etc. The sensors 13-17 may be configured to detect various alarm events, such as the presence of smoke or fire, or a forced or unauthorized opening of a door or window at the monitored site 12, and to transmit electrical signals indicative of such alarm events to the alarm panel 18.

Upon identifying a detected alarm event, the alarm panel 18 may activate various notification devices (not shown, but that may include strobes, horns, buzzers, etc.) that may be distributed throughout the monitored site 12 for notifying occupants of the monitored site 12 of the alarm event. Additionally or alternatively, the alarm panel 18 may utilize a communicator module 20 to transmit, via a wired or wireless communication path 22, a notification of the alarm event to a remotely-located central station 24 that may be responsible for maintaining and monitoring the alarm system 11. The central station 24 may subsequently issue personnel to the monitored site 12 or may contact police, fire, or other appropriate entities to address the alarm event. The communicator module 20 may be an integral or add-on component of the alarm panel 18 and may be adapted to facilitate communication via any of a variety of wired or wireless communication means, including, but not limited to, public switched telephone network, Ethernet, WiFi, and/or cellular communication using various mobile communications standards (e.g., 3G, 4G, etc.).

In addition to transmitting notifications of alarm events to the central station 24, the communicator module 20 may be adapted to capture identifying information that may be transmitted by mobile devices in the vicinity of the monitored site 12. This information can be used to identify individuals who may have been present at or near the monitored site 12 before, during, and/or after detection of an alarm event by the alarm system 11. These individuals may include persons of interest who may have committed a crime at the monitored site 12 or who may have witnessed criminal activity at the monitored site 12. Thus, the system 10 may facilitate the identification and capture of criminals and/or the recovery of stolen property as further described below.

During normal operation, a conventional mobile device may periodically "check-in" with a mobile communication network (e.g., a cellular network) on which the mobile device operates so that the mobile communication network may determine the location of the mobile device to facilitate efficient routing of phone calls and data packages to and from the mobile device. This check-in process may be accomplished by the mobile device transmitting a signal containing a data packet, herein referred to as a "check-in packet," to nearby communication towers (e.g., cellular towers) in the mobile communication network. This check-in packet may include certain identifying information, herein referred to as a "mobile device identifier," for allowing the communication network to identify the mobile device. A mobile device identifier may include, but is not limited to, an electronic serial number (ESN) or a subscriber identity module (SIM) card number that is unique to the mobile device and that is generally associated with a unique account of an owner or user of the mobile device.

Figure 2:
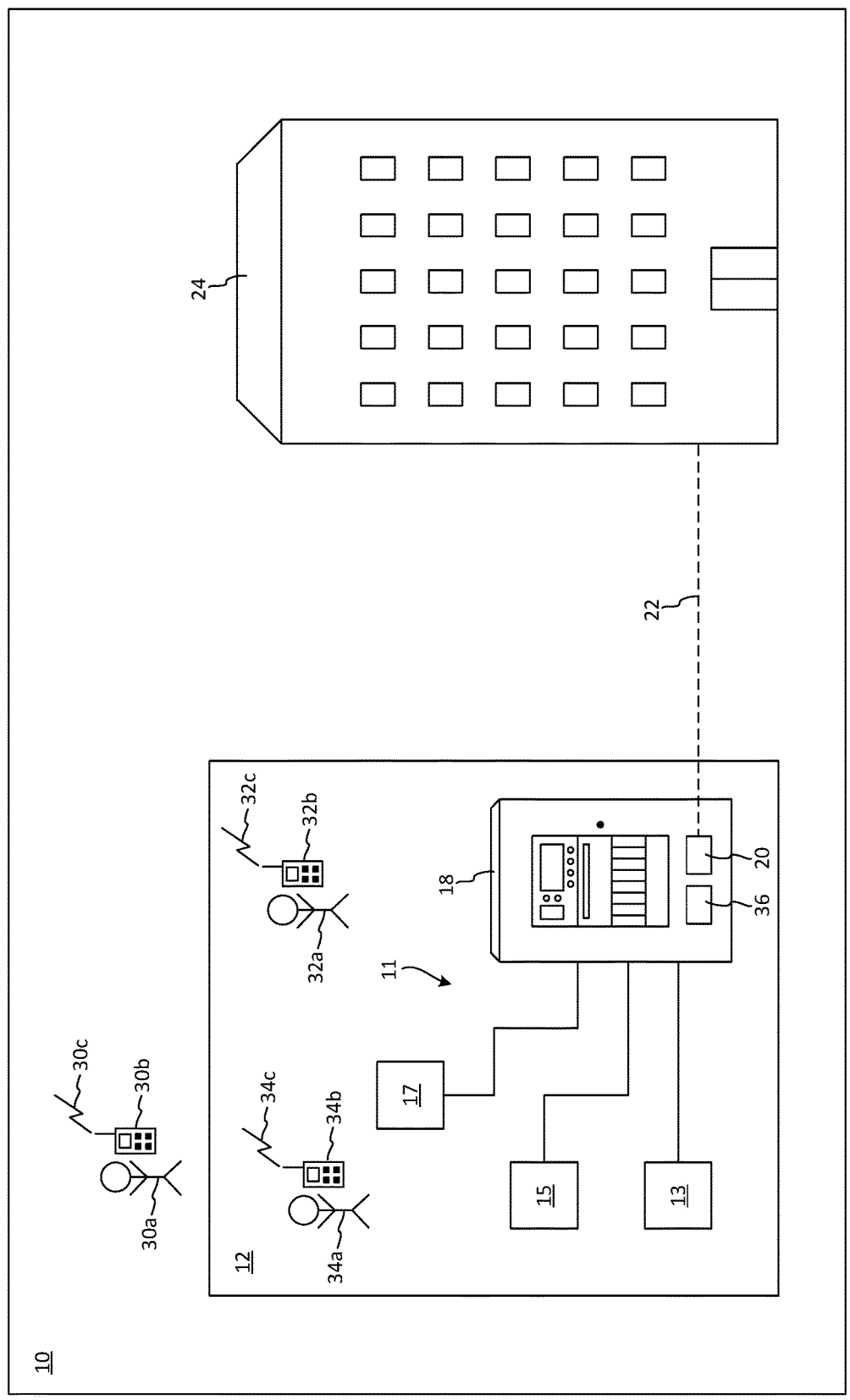
FIG. 2 is a schematic diagram illustrating the exemplary system shown in FIG. 1 with a plurality of individuals in the vicinity of the monitored site.

The system 10 of the present disclosure leverages the above-described check-in process to facilitate the identification of persons of interest. For example, referring to FIG. 2, a plurality of individuals 30a, 32a, 34a may be in the vicinity of the monitored site 12 and may carry respective mobile devices 30b, 32b, 34b. The individuals 30a, 32a, 34a depicted in FIG. 2 may represent persons who are in the vicinity of the monitored site 12 simultaneously, or persons who move into and out of the vicinity of the monitored site 12 at different times. "The vicinity" of the monitored site 12 may be an area within a predefined distance from the communicator module 20 or from some other component of the alarm system 11, and may include some or all of the monitored site 12 as well as an area outside of the monitored site 12. The predefined distance may be a value that is set by a technician or an administrator of the alarm system 10 after the alarm panel 18 has been installed at the monitored site 12. Alternatively, the predefined distance may be permanently set when the alarm panel 18 and/or the communicator module 20 are manufactured.

As described above, the mobile devices 30b, 32b, 34b may periodically transmit respective signals 30c, 32c, 34c containing check-in packets intended for receipt by one or more communication networks on which the mobile devices 30b, 32b, 34b operate. In order to facilitate the identification of persons of interest, the communicator module 20 of the alarm panel 18 may be configured to capture these signals 30c, 32c, 34c in a manner similar to that in which the signals 30c, 32c, 34c are normally captured by communication networks. While signals containing check-in packets are typically transmitted from mobile devices using cellular communication protocols (e.g., 3G, 4G, etc.), the communicator module 20 may additionally or alternatively be configured to capture mobile device identifiers that are made available by mobile devices via Bluetooth, Wi-Fi, and other communication protocols that allow mobile devices to interface with other devices as further described below.

Generally, the communicator module 20 may be adapted to capture signals transmitted by mobile devices at times when the communicator module 20 is idle (e.g., when the communicator module 20 is not actively transmitting information to the central station 24, to a communication network, etc.). Alternatively, the communicator module 20 may be adapted to transmit information and to capture signals simultaneously. Still further, it is contemplated that the alarm panel 18 may be provided with a plurality of communicator modules, wherein one or more of the communicator modules may be dedicated to capturing signals and wherein one or more other of the communicator modules may be dedicated to transmitting information.

The communicator module 20 may be configured to evaluate a signal strength associated with each of the captured signals 30c, 32c, 34c, wherein the signal strength may generally correspond to a distance between a mobile device and the communicator module 20 (i.e., the weaker the signal strength, the greater the distance between a cell phone and the communicator module 20). For example, the signal 30c transmitted by the mobile device 30b may be associated with a relatively weak signal strength compared to the signals 32c, 34c transmitted by the mobile devices 32b, 34b since the mobile device 30b is furthest from the communicator module 20. By contrast, the signal 32c transmitted by the mobile device 32b may be associated with a relatively strong signal strength compared to the signals 30c, 34c transmitted by the mobile devices 30b, 34b, since the mobile device 32b is closest to the communicator module 20.

The communicator module 20 may be configured to maintain, such as in an associated memory 36, a list, herein referred to as an "active device identifier list," of mobile device identifiers extracted from a predefined number of the strongest signals received from mobile devices during a predefined period of time (e.g., 24 hours, 1 week, 1 month, etc.), herein referred to as an "active identification period." For example, the communicator module 20 may be configured to maintain an active device identifier list of mobile device identifiers extracted from the 100 strongest signals received during a preceding 24 hour active identification period. Each of these mobile device identifiers may be recorded in the active device identifier list along with a time and date of recordation (i.e., a "time stamp"), as well as an indication of the mobile device identifier's associated signal strength. The active device identifier list may be updated continuously. For example, if the active device identifier list is completely full and the communicator module 20 captures a signal having a strength that is greater than the weakest signal strength previously recorded in the active device identifier list, the mobile device identifier that is associated with that weakest signal strength may be deleted from the active device identifier list and the mobile device identifier that is extracted from the newly received signal may be added to the active device identifier list. An exception to this may be that if a mobile device identifier is captured and is determined to have an existing, previously recorded entry in the active identifier list, that exiting entry may be updated with a timestamp and signal strength associated with the newly received signal regardless of the strength of the newly received signal. This exception may allow an old and outdated indication of the presence of a particular mobile device to be updated with a new, more recent indication of such presence, thereby providing a more accurate representation of mobile devices that were recently in the vicinity of the monitored site 12.

If a mobile device identifier has been on the active device identifier list for an amount of time equal to the active identification period, that mobile device identifier may be determined to be associated with an individual who has moved out of the vicinity of the communicator module 20 and who is no longer relevant to any alarm events that may arise. That mobile device identifier may therefore be automatically deleted from the active device identifier list after expiration of the active identification period. Also, if a mobile device identifier is received repeatedly with a regular frequency (e.g., a typical check-in frequency for mobile devices) for a predefined amount of the time (e.g., 24 hours, 1 week, 1 month, etc.), herein referred to as a "stagnation period," and the strength of the signal associated with that mobile device identifier does not vary significantly over such period, that mobile device identifier may be determined to be associated with an immobile communication device (e.g., a communicator module of another alarm panel) that is not carried by an individual. That mobile device identifier may therefore be automatically deleted from the active device identifier list after expiration of the stagnation period and may be stored in a separate list, referred to herein as an "exclude list," that may be used as a reference to prevent the deleted mobile device identifier from being added back to the active device identifier list in the future. In view of the forgoing, it will be appreciated that the active device identifier list may not always be full. The active identification period and the stagnation period may be set by a technician or an administrator of the system 10 after the alarm panel 18 has been installed at the monitored site 12. Alternatively, the active identification period and the stagnation period may be permanently set when the alarm panel 18 and/or the communicator module 20 are manufactured.

When the alarm panel 18 identifies an alarm event, such as a forced entry or a fire at the monitored site 12, the active device identifier list, including timestamps and signal strengths maintained in the active device identifier list, may be copied, and the copy, herein referred to as an "event device identifier list," may be stored in the memory 36 or in a different memory that is internal or external to the alarm panel 18 or the communicator module 20. Thus, the event device identifier list, which contains mobile device identifiers that were captured during the active identification period leading up to the alarm event, may be preserved in association with the alarm event while the active device identifier list may continue to be updated in the manner described above. Subsequent alarm events may therefore result in the creation of additional event device identifier lists that may be similarly created and preserved in memory.

It is contemplated that mobile device identifiers extracted from signals that are received by the communicator module 20 during a predefined period of time (e.g., 10 minutes, 1 hour, etc.) after an alarm event, herein referred to as a "tail period," may be added to an event device identifier list or otherwise recorded in association with the event device identifier list even if the event device identifier list is full and even if such signals are weaker than a weakest signal in the event device identifier list. This is because signals received shortly after an alarm event may be associated with persons of interest who may be leaving or fleeing from the monitored site 12. The tail period may be set by a technician or an administrator of the alarm system 11 after the alarm panel 18 has been installed at the monitored site 12. Alternatively, the tail period may be permanently set when the alarm panel 18 and/or the communicator module 20 are manufactured.

Once acquired, an event device identifier list may be transmitted to the central station 24 at substantially the same time as a notification of an associated alarm event. Alternatively, an event device identifier list may be transmitted to the central station 24 at some time after transmission of a notification of an associated alarm event (e.g., after expiration of a tail period). The event device identifier list may additionally or alternatively be made available for local or remote download, or made viewable on a display of the alarm panel 18. The mobile device identifiers in the event device identifier list may be reviewed by security personnel, law enforcement personnel, insurance providers, and other interested parties in order to identify potential persons of interest relative to the associated alarm event. Once identified, such persons of interest may be sought out and questioned as suspected witnesses or perpetrators of the alarm event. The system 10 may thereby facilitate the identification and prosecution of criminals and/or the recovery of stolen property.

In a further embodiment of the system 10, it is contemplated that mobile device identifiers that are extracted from non-cellular signals (e.g., Bluetooth signals, WiFi signals, etc.) emitted by mobile devices in the vicinity of the monitored area 12 may be recorded, along with timestamps, in a list, herein referred to as a "non-cellular device identifier list," that may be maintained in the memory 36 separate from the active device identifier list. Non-cellular signals may be emitted by various types of mobile devices, including "non-cellular" mobile devices (e.g., fitness trackers, wearable health monitors, portable media players, tablet computers, portable global positioning satellite (GPS) devices, etc.) that generally do not transmit data via cellular signals. While these non-cellular signals may include mobile device identifiers that may be unique to, or that may be indicative of, the mobile devices from which they are transmitted, such mobile device identifiers may not be associated with unique accounts of owners or users of mobile devices. Nonetheless, these mobile device identifiers may be used to identify persons of interest after the occurrence of an alarm event as further described below.

In one example, referring again to FIG. 1, an individual, such as a repairman, technician, painter, plumber, salesperson, etc., may visit the monitored site 12 for one or more scheduled appointments, such as to perform a service, over the course of one or more consecutive or non-consecutive days. This individual may be carrying a mobile device that may periodically transmit a non-cellular signal. The communicator module 20 may capture this non-cellular signal on each occasion that the individual visits the monitored site 12 and may store an associated mobile device identifier and a timestamp in the above-described non-cellular device identifier list.

Having gained some knowledge of the monitored site 12 during the scheduled appointment(s), the individual may return to the monitored site 12 at some later date (e.g., days, weeks, or months after the scheduled appointment(s)), and may instigate an alarm event, such as by breaking into the monitored site 12. At this later date, the individual may be carrying the same mobile device that he or she carried during prior visits to the monitored site 12, and the communicator module 20 may again capture a non-cellular signal emitted from the mobile device and may store the associated mobile device identifier and a timestamp in the non-cellular device identifier list. Upon the occurrence of the alarm event, the communicator module 20 may automatically determine that the mobile device identifier, which may have been captured during a predefined period of time surrounding the alarm event, herein referred to as an "event period," had been recorded in the non-cellular device identifier list on one or more prior dates/times (i.e., during prior scheduled appointment(s)), and may copy the mobile device identifier and all associated timestamps in the non-cellular device identifier list to an event device identifier list along with the content of an active device identifier list (described above). The mobile device identifier, along with the associated timestamps from the non-cellular device identifier list, may be used to identify an individual or an entity associated with the prior scheduled appointment(s), which may ultimately lead to the identification of the individual(s) who instigated the alarm event.

The mobile device identifiers recorded in the non-cellular device identifier list may be maintained indefinitely, or may be deleted after the expiration of an active identification period as described above. An active identification period that is associated with the non-cellular device identifier list may have a predefined duration that is the same as, or that is different from (e.g., longer than) the duration of the active identification period associated with the active device identifier list. The non-cellular device identifier list may also be associated with a tail period of predefined duration that is the same as, or that is different from, the duration of the tail period associated with the event device identifier list.

It is contemplated that the communicator module 20 may be configured to ignore mobile device identifiers that are associated with trusted occupants or frequenters of the monitored site 12 (e.g., residents, friends, employees, etc.), herein referred to as "trusted individuals," so that the active device identifier list and/or the non-cellular device identifier list are not constantly saturated with such mobile device identifiers. For example, it is contemplated that the communicator module 20 may be manually put into a "learning mode" for a predefined amount of time (e.g., 30 seconds, 5 minutes, 15 minutes, etc.), herein referred to as a "learning period," during which trusted individuals may bring their mobile devices into the vicinity of the monitored site 12. The communicator module 20 may be configured to add any mobile device identifiers that were captured during the learning period to a list, herein referred to as a "safe list," that may be maintained in the memory 36, and to subsequently ignore mobile device identifiers on the safe list when they are captured. Additionally or alternatively, the communicator module 20 may be configured to automatically add a mobile device identifier to the safe list after that mobile device identifier has been captured a predefined number of times and/or with a predefined frequency.

Figure 3:
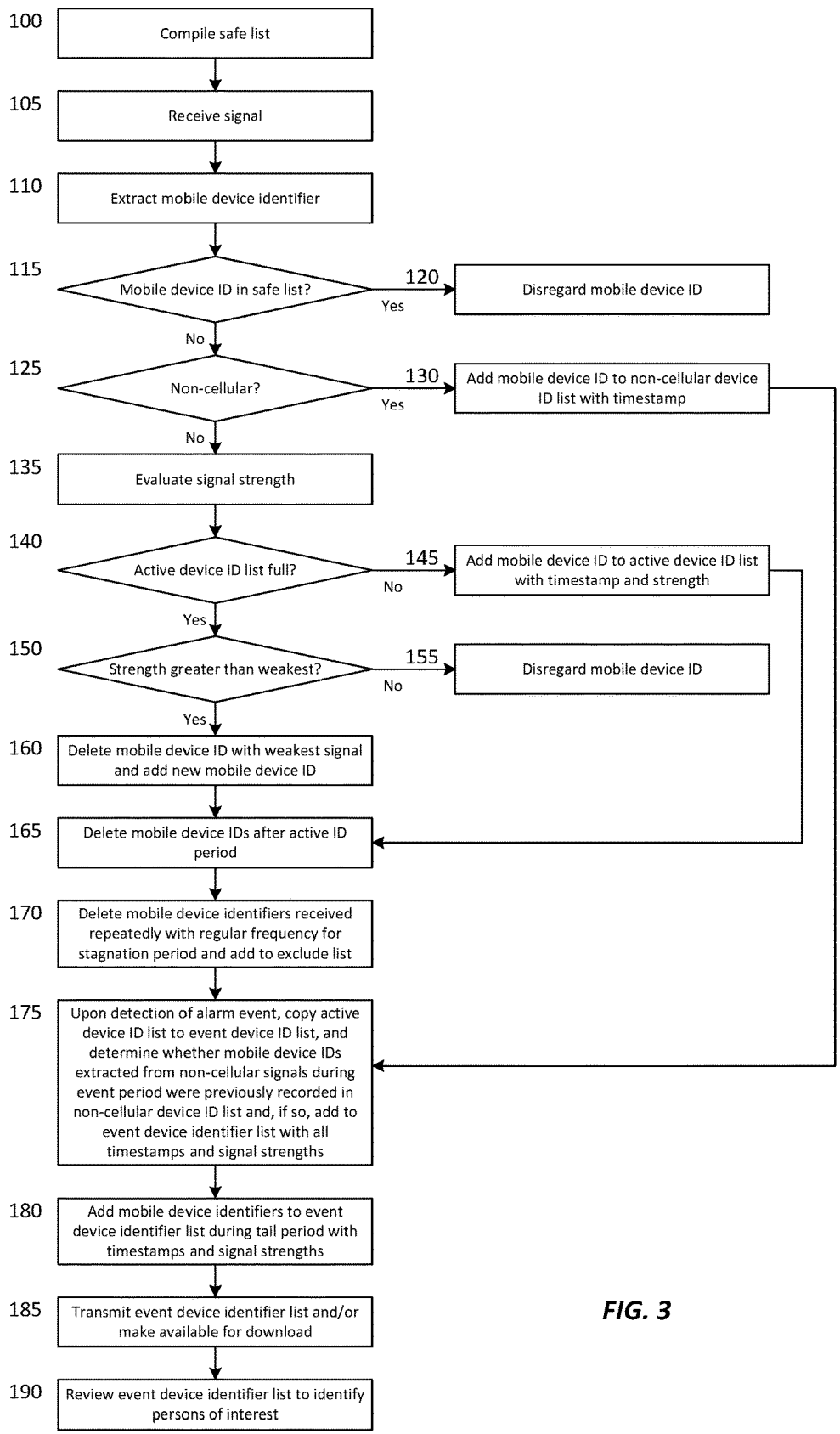
FIG. 3 is a flow diagram illustrating an exemplary embodiment of a method for identifying persons of interest in accordance with the present disclosure.

Referring to FIG. 3, a flow diagram illustrating an exemplary method for using mobile device information to identify persons of interest in the vicinity of an alarm event in accordance with the present disclosure is shown. The method will now be described in detail in conjunction with the schematic representations of the system 10 shown in FIGS. 1 and 2.

At step 100 of the exemplary method, the communicator module may compile a safe list of mobile device identifiers associated with mobiles devices belonging to trusted individuals. The safe list may be compiled entirely automatically, or upon the manual activation of a learning mode of the communicator module 20 as described above.

At step 105 of the exemplary method, the communicator module 20 may receive a signal transmitted from a mobile device that is in the vicinity of the monitored site 12. At step 110 of the method, the communicator module may extract a mobile device identifier from the signal. At step 115 of the method, the communicator module 20 may determine whether the mobile device identifier is in the safe list.

If the mobile device identifier is in the safe list, the communicator module 20 may, at step 120 of the method, disregard the mobile device identifier. If the mobile device identifier is not in the safe list, the communicator module 20 may determine, at step 125 of the method, whether the signal is a non-cellular signal that does not contain a check-in packet that identifying a unique user account.

If the mobile device identifier is a non-cellular signal, the communicator module 20 may, at step 130 of the exemplary method, add the mobile device identifier, along with a time stamp, to a non-cellular device identifier list that is maintained in the memory 36, and the method may proceed directly to step 175 below (skipping steps 135-170). If the signal is a signal that does contain a check-in packet that identifies a unique user account, the communicator module 20 may, at step 135 of the method, evaluate a strength of the signal.

At step 140 of the exemplary method, the communicator module may determine whether an active device identifier list is full. If the active device identifier list is not full, the communicator module 20 may, at step 145 of the method, add the mobile device identifier, along with a time stamp and an indication of the strength of the signal, to an active device identifier list as described above. If, the active device identifier list is full, the communicator module 20 may, at step 150 of the method, compare the strength of the signal to a weakest previously recorded signal strength in active device identifier list.

If it is determined in step 150 that the strength of the signal is not greater than the weakest previously recorded signal strength, the communicator module 20 may, at step 155 of the method, disregard the mobile device identifier. If it is determined in step 150 that the strength of the signal is greater than the strength of the weakest previously recorded signal, the communicator module 20 may, at step 160 of the method, delete a device identifier associated with the weakest previously recorded signal strength from the active device identifier list and may add the mobile device identifier of the newly received signal to the active device identifier list along with a time stamp and an indication of the strength of the signal.

At step 165 of the exemplary method, the communicator module 20 may determine whether any of the mobile device identifiers in the active device identifier list have been in the active device identifier list for an amount of time equal to or greater than the predefined active identification period, and may delete such mobile device identifiers from the active device identifier list.

At step 170 of the exemplary method, the communicator module 20 may determine whether any of the device identifiers in the active device identifier list have been received repeatedly with a regular frequency and with a substantially consistent signal strength for an amount of the time equal to or greater than the predefined stagnation period, and may delete such mobile device identifiers from the active device identifier list and may record such mobile device identifiers in an exclude list.

At step 175 of the exemplary method, the communicator module 20 may, upon the detection of an alarm event by the alarm panel 18, copy the active device identifier list, including the mobile device identifiers, timestamps, and signal strengths in the active device identifier list, to create an event device identifier list, and may store the event device identifier list in the memory 36 or in another memory. The communicator module 20 may additionally determine whether any mobile device identifiers extracted from non-cellular signals received during an event period surrounding the alarm event were previously recorded in the non-cellular device identifier list, and if so, may add such mobile device identifiers, along with all associated entries and timestamps from the non-cellular device identifier list, to the event device identifier list.

At step 180 of the exemplary method, the communicator module 20 may add mobile device identifiers that are extracted from signals received during a predefined tail period following the alarm event to the event device identifier list along with timestamps and indications of the strengths of such signals.

At step 185 of the exemplary method, the event device identifier list may be transmitted to the central station 24, and may additionally or alternatively be made available for local or remote download or made viewable on a display of the alarm panel 18.

At step 190 of the exemplary method, law enforcement, security personnel, and other interested parties may use the information in the event device identifier list to identify persons of interest relative to the alarm event.

Figure 4:
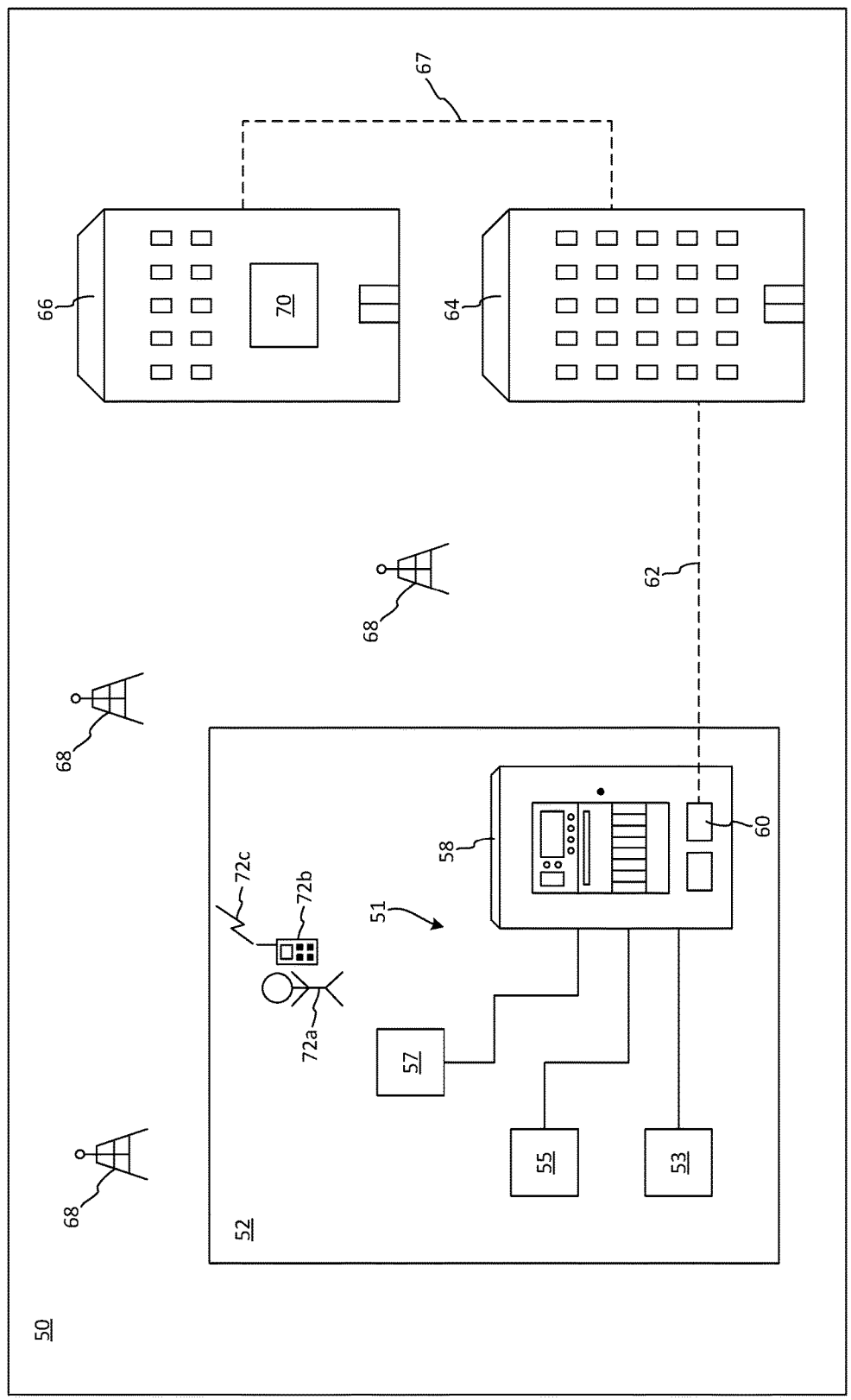
FIG. 4 is a schematic diagram illustrating another exemplary embodiment of a system for identifying persons of interest accordance with the present disclosure.

Referring to FIG. 4, a schematic diagram of another system 50 in accordance with the present disclosure is shown. The system 50 may include an alarm system 51 that may be or may include any type of alarm system, including, but not limited to, various types of fire and/or security systems that may be configured to detect and report various types of alarm events (e.g., fire, intrusion, etc.) that may take place at a monitored site 52. The monitored site 52 may be any type of structure or area in which an alarm system can be installed, including, but not limited to, a residential home, an office, a retail establishment, a hospital, a sporting venue, a theater, a school, etc.

The alarm system 51 may be similar to the alarm system 11 described above, and may include a plurality of sensors 53, 55, 57 that may be distributed throughout the monitored site 52 and that may be operatively connected to one or more alarm panels 58 located at the monitored site 52. The sensors 53-57 may include, but are not limited to, contact sensors, motion sensors, vibration sensors, temperature sensors, smoke detectors, carbon monoxide detectors, etc. The sensors 53-57 may be configured to detect various alarm events, such as the presence of smoke or fire, or a forced or unauthorized opening of a door or window at the monitored site 52, and to transmit electrical signals indicative of such alarm events to the alarm panel 58.

Upon identifying a detected alarm event, the alarm panel 58 may activate various notification devices (not shown, but that may include strobes, horns, buzzers, etc.) that may be distributed throughout the monitored site 52 for notifying occupants of the monitored site 52 of the alarm event. Additionally or alternatively, the alarm panel 58 may utilize a communicator module 60 to transmit, via a wired or wireless communication path 62, a notification of the alarm event to a remotely-located central station 64 that may be responsible for maintaining and monitoring the alarm system 51. The central station 64 may subsequently issue personnel to the monitored site 52 and/or may contact police, fire, or other appropriate entities to address the alarm event. The communicator module 60 may be an integral or add-on component of the alarm panel 58 and may be adapted to facilitate communication via any of a variety of wired or wireless communication means, including, but not limited to, public switched telephone network, Ethernet, WiFi, and/or cellular communication using various mobile communications standards (e.g., 3G, 4G, etc.).

The central station 64 may be in communication with a mobile network service provider 66 via a wired or wireless communication path 67. The mobile network service provider 66 may maintain a mobile commination network (e.g., a cellular network) for facilitating communication between mobile devices. The mobile communication network may include a plurality of communication towers 68 (e.g., cellular towers) for routing phone calls and data packages to and from mobile devices in a manner that will be familiar to those of ordinary skill in the art.

During normal operation, a mobile device, such as a mobile device 72b carried by an individual 72a, that operates on the mobile communication network may periodically "check-in" with the mobile communication network so that the mobile communication network may determine the location of the mobile device 72b in order to facilitate efficient routing of phone calls and data packages to and from the mobile device 72b. This check-in process is accomplished by the mobile device 72b transmitting a signal 72c that may be received by the communication towers 68. By measuring a strength of the signal 72c at three or more of the communication towers 68, a geographic location of the mobile 72b device may be triangulated. Additionally, the signal transmitted by the mobile device 72b may contain a data packet, herein referred to as a "check-in packet." This check-in packet may include certain identifying information, herein referred to as a "mobile device identifier," for allowing the mobile communication network to identify the mobile device 72b. A mobile device identifier may include, but is not limited to, an electronic serial number (ESN) or a subscriber identity module (SIM) card number that is unique to the mobile device 72b and that is generally associated with a unique account of an owner or user (e.g., the individual 72a) of the mobile device 72b. The mobile network service provider 66 may maintain one or more databases 70 that include times, dates, geographic locations, and mobile device identifiers associated with numerous check-in packets that are transmitted from numerous mobile devices and received by the mobile network service provider 66 via the communication towers 68.

The system 50 of the present disclosure leverages the above-described check-in process to facilitate the identification of persons of interest. For example, when the alarm panel 58 identifies an alarm event, such as a forced entry or a fire at the monitored site 52, the alarm panel 58 may transmit a notification of the alarm event to the central station 64 as described above. Upon receiving the notification of the alarm event, or at some later time, the central station 64 may automatically issue a request to the mobile network service provider 66 to provide, from the database 70 maintained by the mobile network service provider 66, a list, herein referred to as an "event device identifier list," of mobile device identifiers received from mobile devices that were determined (via triangulation as described above) to have been within the vicinity of the monitored site 52 during a predefined period of time (e.g., 24 hours, 1 week, 1 month, etc.), herein referred to as an "event period," that may start at a time before the alarm event and end at a time after the alarm event. "The vicinity" of the monitored site 52 may be an area within a predefined distance from the communicator module 60 or from some other component of the alarm system 51, and may include some or all of the monitored site 52 as well as an area outside of the monitored site 52. The predefined distance and the duration/span of the event period may be values that are set by a technician or an administrator of the system 50, such as at the alarm panel 58, at the central station 64, and/or at the mobile network service provider 66.

The event device identifier list may be transmitted to the central station 64 and may be additionally or alternatively be made available for local or remote download. The mobile device identifiers in the event device identifier list may be reviewed by security personnel, law enforcement personnel, insurance providers, and other interested parties in order to identify potential persons of interest relative to the associated alarm event. Once identified, such persons of interest may be sought out and questioned as suspected witnesses or perpetrators of the alarm event. The system 50 may thereby facilitate the identification and prosecution of criminals and/or the recovery of stolen property.

In a further embodiment of the system 50, it is contemplated that, in addition to requesting an event device identifier list from the mobile network service provider 66, the central station 64 may contact one or more entities that use GPS to track vehicles. Such entities are herein referred to as "vehicle tracking entities." Vehicle tracking entities may include, but are not limited to, fleet tracking service providers, anti-theft/vehicle location service providers, and rental car companies. The central station 64 may request vehicle location logs from vehicle tracking entities and may use such vehicle location logs to identify vehicles that were in the vicinity of the monitored site 52 during the event period. If it is determined that vehicles that are not normally in the vicinity of the monitored site 52 were in the vicinity of the monitored site 52 during the event period, the owners/operators of such vehicles may be identified as persons of interest relative to the alarm event.

Figure 5:
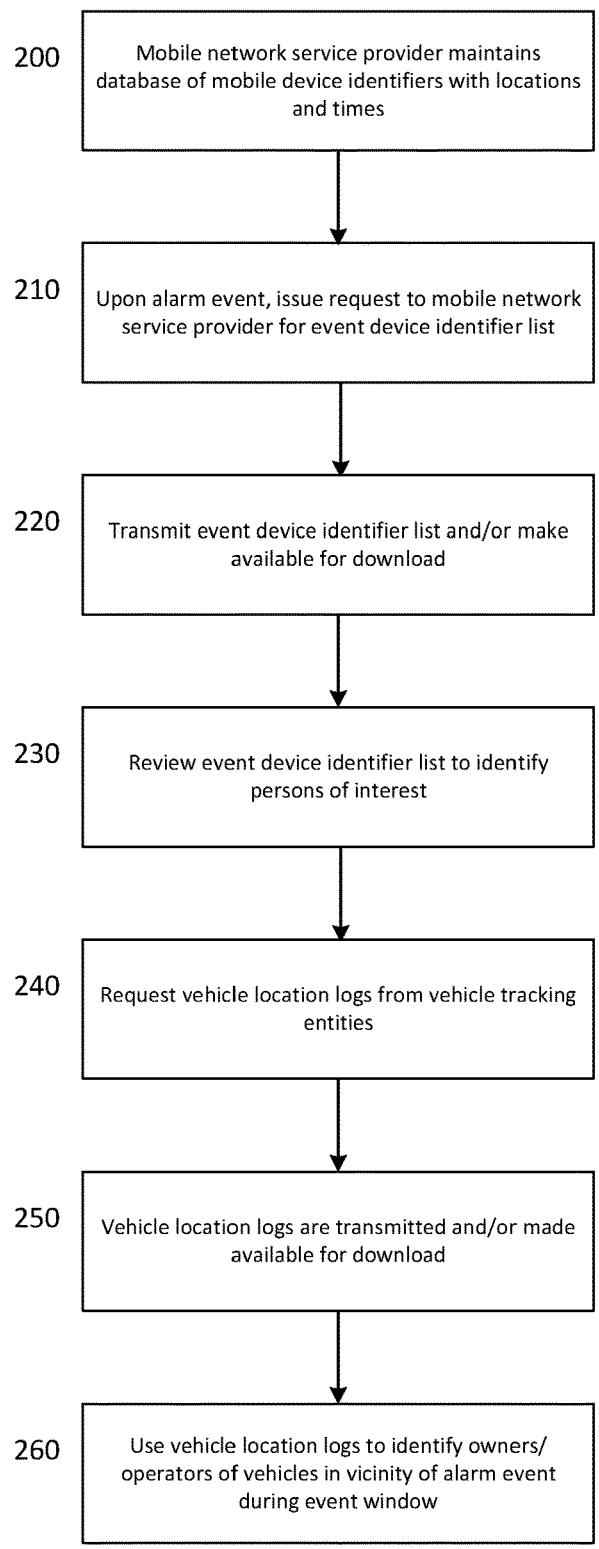
FIG. 5 is a flow diagram illustrating another exemplary embodiment of a method for identifying persons of interest in accordance with the present disclosure.

Referring to FIG. 5, a flow diagram illustrating another exemplary method for using mobile device information to identify persons of interest in the vicinity of an alarm event in accordance with the present disclosure is shown. The method will now be described in detail in conjunction with the schematic representations of the alarm system 50 shown in FIG. 4.

At step 200 of the exemplary method, the mobile network service provider 66 may maintain the database 70 that includes times, dates, geographic locations, and mobile device identifiers associated with check-in packets that are received by the mobile network service provider 66.

At step 210 of the exemplary method, the central station 64 may, upon receiving a notification of an alarm event from the alarm panel 58, issue a request to the mobile network service provider 66 to provide, from the database 70, an event device identifier list of mobile device identifiers received from mobile devices that were determined (via triangulation as described above) to have been within the vicinity of the monitored site 52 during the predefined event period.

At step 220 of the exemplary method, the event device identifier list may be transmitted to the central station 64 and may additionally or alternatively be made available for local or remote download.

At step 230 of the exemplary method, law enforcement, security personnel, and other interested parties may use the event device identifier list to identify persons of interest relative to the alarm event.

At step 240 of the exemplary method, the central station 64 may request vehicle location logs from one or more vehicle tracking entities. At step 250 of the method, the one or more vehicle tracking entities may transmit the requested vehicle location logs to the central station 64 and may additionally or alternatively make such logs available for download.

At step 260 of the exemplary method, law enforcement, security personnel, and other interested parties may use the vehicle location logs to identify vehicles that were in the vicinity of the monitored site 52 during the event period, which in-turn may be used to identify additional persons of interest relative to the alarm event.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The various embodiments or components described above may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

The invention claimed is:

1. An alarm system comprising:
an alarm panel;
a sensor operatively connected to the alarm panel and operable to detect alarm events; and
a communicator module operatively connected to the alarm panel and operable to:
capture cellular signals based upon a cellular communication protocol, and transmitted by mobile devices within a predefined area;
extract mobile device identifiers from the cellular signals; and
record the mobile device identifiers in an active device identifier list that is maintained in a memory associated with the communicator module, the active device identifier list comprising mobile device identifiers extracted from a predefined number of the strongest signals received from the mobile devices during a predefined period of time.

2. The alarm system of claim 1, wherein the communicator module is further operable to evaluate respective strengths of the cellular signals and to determine whether to record mobile device identifiers extracted from the cellular signals to the active device identifier list based on the strengths.

3. The alarm system of claim 1, wherein the communicator module is further operable to record mobile device identifiers extracted from non-cellular signals, in a non-cellular device identifier list that is maintained in the memory.

4. The alarm system of claim 1, wherein the communicator module is further operable to delete a mobile device identifier from the active device identifier list after that mobile device identifier has been in the active device identifier list for an active identification period of predefined length since that mobile device identifier was last captured within the predefined area.

5. The alarm system of claim 1, wherein the communicator module is further operable to copy the active device identifier list to a separate event device identifier list upon detection of an alarm event, and to record the event device identifier list in the memory.

6. The alarm system of claim 5, wherein the communicator module is further operable to transmit the event device identifier list from a monitored site which is monitored by the alarm system, to a central station that is remote from the monitored site.

7. The alarm system of claim 5, wherein the communicator module is further operable to record mobile device identifiers extracted from cellular signals received during a tail period of predefined length following an alarm event, to the event identifier list.

8. The alarm system of claim 1, wherein the communicator module in further operable to determine whether the mobile device identifiers are in a safe list that is maintained in the memory, and to forgo adding mobile device identifiers that are in a safe list to the active device identifier list.

9. A method for identifying persons of interest, the method comprising:
receiving, at a communicator module in an alarm panel of an alarm system, a cellular signal transmitted from a mobile device that is in a vicinity of a monitored site where the alarm system is installed;
the communicator module extracting a mobile device identifier from the cellular signal;
the communicator module determining whether the mobile device identifier is to be added to an active device identifier list based upon a strength of the cellular signal; and
the communicator module adding the mobile device identifier to the active device identifier list if the communicator module determines that the mobile device identifier is to be added to the active device identifier list;
wherein determining whether the mobile device identifier should be added to the active device identifier list comprises the communicator module evaluating a strength of the cellular signal and comparing the strength to a weakest previously recorded signal strength in the active device identifier list.

10. The method of claim 9, wherein determining whether the mobile device identifier should be added to the active device identifier list comprises the communicator module determining whether the active device identifier list is full.

11. The method of claim 9, further comprising the communicator module compiling a safe list of mobile device identifiers associated with mobile devices belonging to trusted individuals.

12. The method of claim 11, wherein determining whether the mobile device identifier should be added to the active device identifier list comprises the communicator module determining whether the mobile device identifier is in the safe list.

13. The method of claim 9, further comprising the communicator module determining a non-cellular device identifier from a non-cellular signal and recording the mobile device identifier in a non-cellular device identifier list.

14. The method of claim 9, further comprising the communicator module deleting the mobile device identifier from the active device identifier list after the mobile device identifier has been in the active device identifier list for an active identification period of predefined length since that mobile device identifier was last captured within the vicinity of the monitored site.

15. The method of claim 9, further comprising the communicator module copying the active device identifier list to create an event device identifier list upon the detection of an alarm event.

16. The method of claim 15, further comprising the communicator module transmitting the event device identifier list to a central station that is remote from the monitored site.

17. The method of claim 15, further comprising the communicator module adding the mobile device identifier to the event device identifier list if the cellular signal is received during a tail period of predefined length following the alarm event.

18. A method for identifying persons of interest comprising:
 a mobile network service provider maintaining a database of mobile device identifiers, timestamps, and geographic locations associated with check-in packets transmitted via cellular signals by mobile devices; and
 a central station issuing, upon receiving a notification of an alarm event at a monitored site that is monitored by the central station, a request to the mobile network service provider for mobile device identifiers associated with a predefined number of strongest signals received from mobile devices determined via the cellular signals to have been within the predetermined area during a predefined event period.

19. The method of claim 18, further comprising the mobile network service provider transmitting to the central station, an event identifier list containing the requested mobile device identifiers.

20. The method of claim 18, further comprising the mobile network service provider making available for download an event identifier list containing the requested mobile device identifiers.

21. The method of claim 18, further comprising the central station issuing a request to a vehicle tracking entity for a list of vehicles that were in the predetermined area during the event period.

* * * * *